June 4, 1929.　　　R. M. GIFFEN　　　1,716,121
HYDRAULIC ACTUATING DEVICE FOR AIRCRAFT
Filed July 30, 1923　　　3 Sheets-Sheet 1
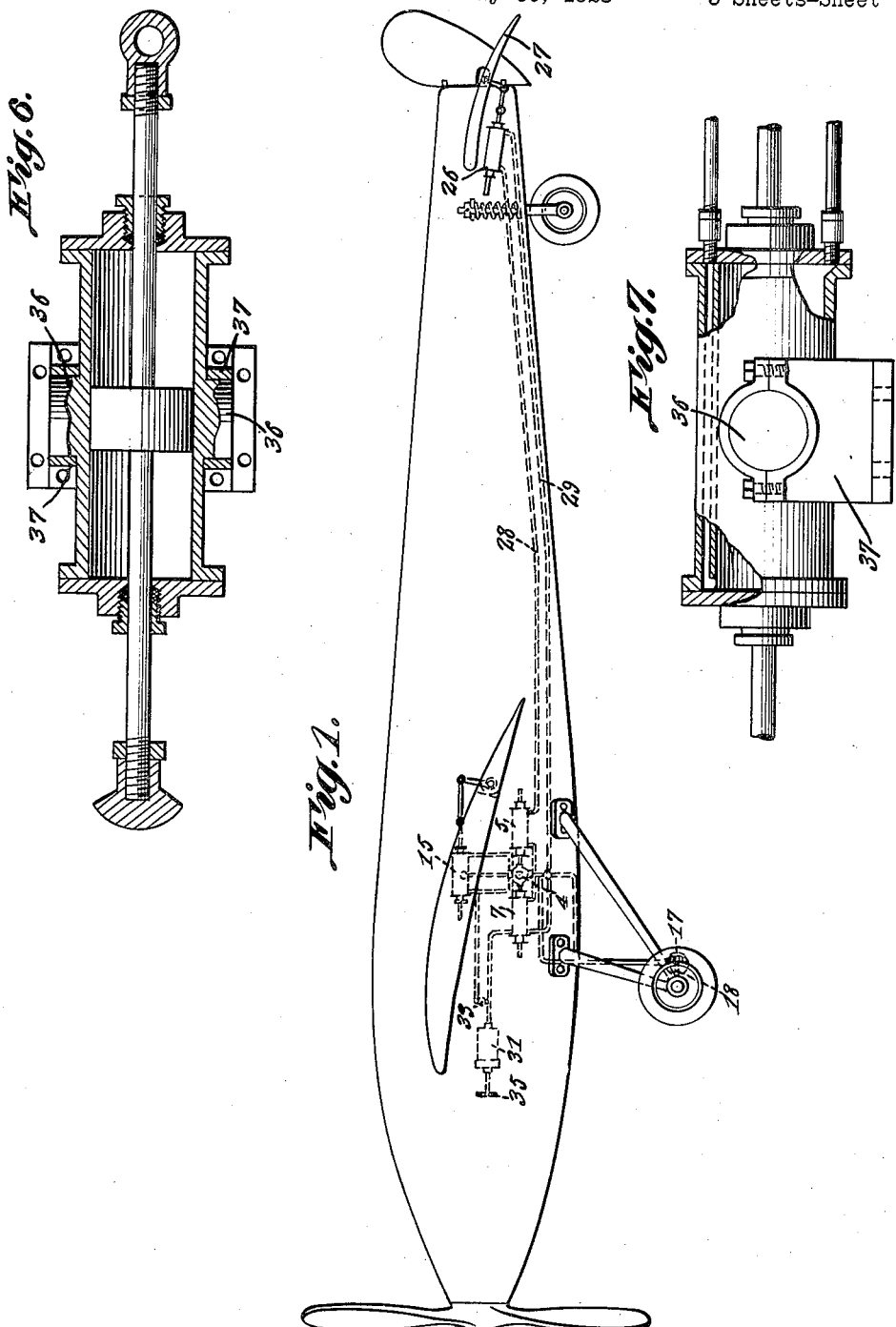
R. M. Giffen, INVENTOR
BY Victor J. Evans
ATTORNEY June 4, 1929. R. M. GIFFEN 1,716,121
HYDRAULIC ACTUATING DEVICE FOR AIRCRAFT
Filed July 30, 1928 3 Sheets-Sheet 2
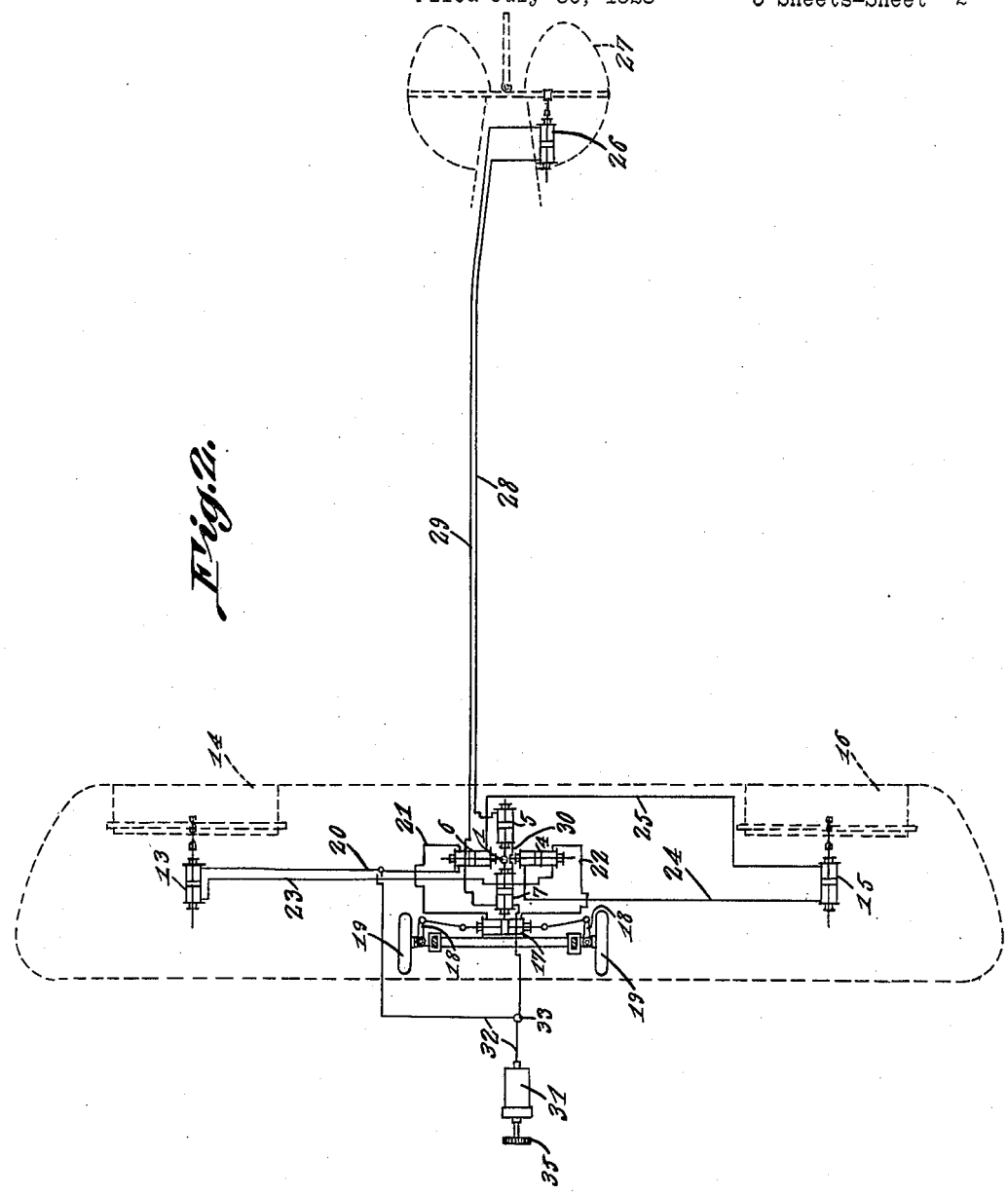
R. M. Giffen, INVENTOR
BY Victor J. Evans
ATTORNEY

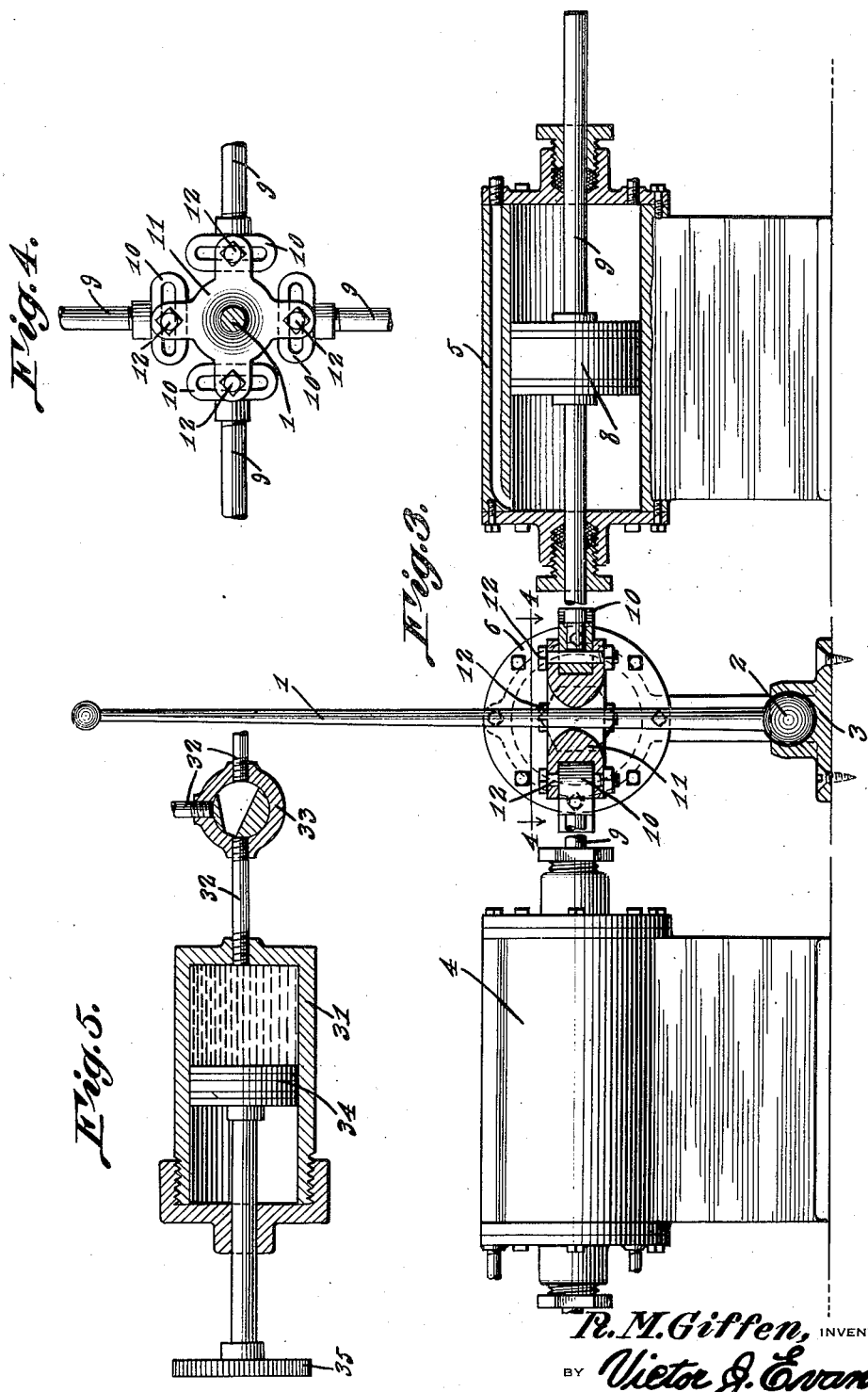

Patented June 4, 1929.

1,716,121

UNITED STATES PATENT OFFICE.

ROBERT MALCOLM GIFFEN, OF KLAMATH FALLS, OREGON.

HYDRAULIC ACTUATING DEVICE FOR AIRCRAFT.

Application filed July 30, 1928. Serial No. 296,123.

This invention relates to a double acting hydraulic actuating device for the controls of an aircraft, the general object of the invention being to provide a plurality of cylinders each containing a centrally arranged piston, with pipes connecting the cylinders together, some of the cylinders being connected with the controls or steering mechanism of the craft and others having their pistons operable from a manually operated member so that the movement imparted to the pistons of such member will be transmitted by the fluid to the steering mechanism or controlling device by the pistons in the cylinders which are connected with such device, the parts being so connected together that when each piston is moved in one direction to force fluid from one end of its cylinder, some of the fluid from other cylinders will enter the other end of the cylinder in question so as to prevent a vacuum occurring in said cylinder.

A further object of the invention is to so arrange the cylinders which are associated with the manually operated member that the pistons in two of the cylinders can be moved by said member when the same is moved in a certain plane and the pistons of the two other cylinders will be moved by said member when said member is moved in another plane.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is an elevation of a flying machine, showing the invention in use.

Figure 2 is a top plan view.

Figure 3 is an enlarged elevation, with parts in section, showing how the control lever is connected with the piston rods of the cylinders associated with said lever.

Figure 4 is a section on line 4—4 of Figure 3.

Figure 5 is a sectional view through the cylinder for the reserve oil supply.

Figure 6 is a longitudinal sectional view through one of the cylinders, showing means for supporting the cylinder for rocking movement.

Figure 7 is a side view with parts broken away of Figure 6.

As shown in these views, the numeral 1 indicates the control lever or stick of the aeroplane which is supported so that it can be moved in any direction by means of the spherical member 2 at its lower end engaging the socket 3 which is secured to a floor part of the craft. Four horizontal cylinders 4, 5, 6 and 7 are suitably supported adjacent the lever 1, the cylinders being arranged in pairs, the cylinders of one pair being arranged at right angles to those of the other pair and the cylinders of each pair being in alignment with each other and on opposite sides of the lever. A piston 8 is arranged in each cylinder, with the piston rod 9 passing through both ends of each cylinder and a slotted head 10 is fastened to the inner end of each rod. A cross head 11 has a double conical hole therein through which the lever passes and this head is formed with four pairs of perforated ears, one pair for each head 10, and a bolt 12 passes through each pair of ears and through a slot in the head 10 which extends between the ears of each pair, the parts being so arranged that when the lever is moved in one direction, the cross head 11 will exert a push on the piston rod of one cylinder and a pull on the piston rod of the opposite cylinder without moving the rods of the other two cylinders, as the bolts 12 which connect the head with these other two rods will simply pass through the slots in the heads 10 of said rods.

Thus the lever can be moved to force the piston of one cylinder toward the outer end of said cylinder and move the piston of the opposite cylinder toward the inner end thereof without moving the pistons of the other cylinders and the lever can also be moved in a plane at right angles to the plane of its first movement to operate the pistons of the other two cylinders without moving the pistons of the first pair of cylinders.

A cylinder 13 has its piston rod connected with the aileron 14 at the right hand side of the plane and a cylinder 15 has its piston rod connected with the aileron 16 at the left hand side of the plane, and a cylinder 17 has the ends of its piston rod connected with the steering arms 18 of the wheels 19 of the landing gear. A tube 20 connects the outer end of the cylinder 6 with the rear ends of the cylinder 13 and a tube 21 connects the same end of the cylinder 6 with the right hand end of the cylinder 17. The left hand end of the cylinder 17 is connected by a tube 22 with the outer end of the cylinder 4 and a tube 23 connects this end of the cylinder 4 with the front end of the cylinder 13. A tube 24 connects the inner end of the cylinder 4 with the front end of the cylinder 15 and a tube 25 connects the rear end of the cylinder 15 with the inner end of the cylinder 6.

Thus by moving the control stick to the right, the piston in cylinder 6 will force fluid from the outer end of said cylinder through the tube 20 into the rear end of the cylinder 13, thus forcing the piston in said cylinder forwardly and causing the same to lift the aileron 14. The fluid forced from the cylinder 13 by the piston will flow through the tube 23 into the outer end of the cylinder 4, thus causing the piston in said cylinder 4 to move toward the inner end of the cylinder so that the piston rod of said cylinder will follow the control stick and the fluid forced from the cylinder 4 by the inwardly moving piston thereof will flow through the tube 24 into the front end of the cylinder 15, causing the piston in said cylinder to lower the aileron 16 and the fluid forced from the cylinder 15 by its piston will flow through the tube 25 into the inner end of the cylinder 6, thus preventing a vacuum being formed in said cylinder 6 by its outwardly moving piston. At the same time, fluid will pass from the cylinder 6 through the pipe 21 into the right hand end of the cylinder 17, moving the piston of said cylinder to the left and the fluid ejected by said piston will flow through the tube 22 into the outer end of the cylinder 4. Thus the piston in cylinder 17 will turn the wheels to the right and the ailerons and the wheels will cause the craft to make a right hand turn. When the craft is to make a left hand turn, the control stick is moved to the left to force the piston of cylinder 4 outwardly so that the aileron 14 will be lowered and the aileron 16 raised and the wheels 19 turned to the left.

A cylinder 26 has its piston rod connected with the crank shaft of the rear elevators 27 and a pipe 28 connects the front end of this cylinder with the outer end of the cylinder 5 and a pipe 29 connects the rear end of the cylinder 26 with the outer end of the cylinder 7. The inner end of the cylinder 7 is connected with the inner end of the cylinder 5 by a pipe 30.

Thus when the control stick is moved forwardly, the piston of cylinder 7 will force fluid through the pipe 29 into the rear end of the cylinder 26, causing the piston in said cylinder to shift the elevators 27 to cause the craft to descend, the fluid forced from the cylinder 26 passing through the pipe 28 into the outer end of the cylinder 5, thus causing the piston in said cylinder 5 to follow the forward movement of the control stick, while the fluid forced from the cylinder 5 by its piston will flow through the pipe 30 into the inner end of the cylinder 7. When the control stick is moved rearwardly, the fluid will be forced from the cylinder 5 through the pipe 28 into the front end of the cylinder 26 whereby its piston will shift the elevators 27 in the opposite direction and the fluid forced from said cylinder 26 will flow through the pipe 29 into the outer end of the cylinder 7.

In order to renew the fluid supply, if a leak should occur in the system, I provide a cylinder 31 containing a reserve supply of fluid, this cylinder being connected by the pipes 32 with the pipe 20 and the cylinder 7 with a three-way valve 33 at the junction of the pipes 32 so that by pushing in the piston 34 of the cylinder 31 by means of its handle 35, some of the fluid in the cylinder 31 will be forced into either the cylinder 7 or the tube 20 which is connected with the cylinder 6, according to the position of the valve 33.

It will, of course, be understood that other pistons and cylinders can be provided for operating other control or steering devices of the plane, these cylinders being connected by a tube with the proper cylinders, the pistons of which are operated by the control stick.

From the foregoing it will be seen that I have provided a double acting hydraulic arrangement for controlling various parts of an aeroplane from the control stick and by this arrangement, the movements of the control stick will be quickly and positively communicated to the parts, no matter at what distance they are from the control stick. This hydraulic mechanism will eliminate the use of a multiplicity of links, shafts and the like, thus making the controlling parts more simple and reducing wear and also eliminating lost motion. The double arrangement also insures instantaenous movements of the parts as it prevents vacuum and air spaces from forming in the system. Leakage of fluid can be compensated for by providing the reserve cylinder and if necessary, ball valves can be placed throughout the system, which will automatically operate to close the tubes by a sudden change of oil pressure, due to a breakage in the system. The system is practically trouble-proof and its installation in an aircraft will simplify the maneuvering of the craft and render the craft easy to control.

Figures 6 and 7 show means for supporting some of the cylinders for rocking movement, such means comprising a pair of oppositely arranged trunnions 36 at the central part of the cylinder which engage bearings formed in the uprights 37 between which the cylinder fits. This will enable the cylinders to rock as they are being operated.

It is thought from the foregoing description that the advantages and novel features of the invention will be readily apparent.

It is to be understood that I may make changes in the construction and in the combination and arrangement of the several parts, provided that such changes fall within the scope of the appended claims.

What I claim is:—

1. In combination with a set of steering mechanisms of a device, a cylinder associated with each set, a piston in each cylinder connected with the set, a set of other cylinders having pistons therein, manually operated means for moving the pistons of said other set, tubes connecting the cylinders of the manually operated set with the other cylinders, said tubes and the cylinders having fluid therein, some of the tubes being connected with the front ends of some of the cylinders and other tubes being connected with the rear ends of some of the cylinders whereby when the fluid is forced from one cylinder by the piston of the cylinder, the piston of another cylinder will force the fluid into the other end of the cylinder from which the fluid is being forced to prevent vacuums occurring in the cylinders and means for supporting some of the cylinders whereby they will have rocking movement.

2. In combination with a set of steering mechanisms of a device, a cylinder associated with each set, a piston in each cylinder connected with the set, a set of other cylinders having pistons therein, manually operated means for moving the pistons of said other set, tubes connecting the cylinders of the manually operated set with the other cylinders, said tubes and the cylinders having fluid therein, some of the tubes being connected with the front ends of some of the cylinders and other tubes being connected with the rear ends of some of the cylinders whereby when the fluid is forced from one cylinder by the piston of the cylinder, the piston of another cylinder will force the fluid into the other end of the cylinder from which the fluid is being forced to prevent vacuums occurring in the cylinders, means for supporting some of the cylinders whereby they will have rocking movement and a cylinder having a reserve supply of fluid therein connected with the other cylinders, a hand operated piston in said cylinder and a valve for controlling the flow of fluid from said cylinder to the other cylinders.

3. In an aircraft and in combination with its landing wheels, its ailerons and its elevators, a cylinder having its piston connected with the wheels for imparting steering movement to the wheels, a cylinder having its piston connected with the elevator, a cylinder associated with each aileron and having its piston connected with the aileron, a group of four cylinders associated with the control lever, tubes connecting the latter cylinders with the other cylinders, a tube being connected with each end of each cylinder, the piston of which is connected with a steering or controlling part and means whereby when the control lever is moved in a certain plane, it will operate the pistons of a pair of cylinders which are associated with the lever without operating the pistons of the other pair of cylinders and when the control stick is operated in another plane, it will operate the pistons of the last mentioned pair of cylinders without operating the pistons of the first pair of cylinders.

In testimony whereof I affix my signature.

ROBERT MALCOLM GIFFEN.